United States Patent
Lee et al.

(10) Patent No.: US 7,068,323 B2
(45) Date of Patent: Jun. 27, 2006

(54) TV HAVING OSD FUNCTION AND CONTROL METHOD OF THE SAME

(75) Inventors: Jae Kyung Lee, Daeku (KR); Myoung Hwa Ko, Gumi (KR)

(73) Assignee: LG Electronics Inc., Seoul (KR)

( * ) Notice: Subject to any disclaimer, the term of this patent is extended or adjusted under 35 U.S.C. 154(b) by 719 days.

(21) Appl. No.: 09/842,089

(22) Filed: Apr. 26, 2001

(65) Prior Publication Data

US 2001/0037501 A1    Nov. 1, 2001

(30) Foreign Application Priority Data

Apr. 27, 2000    (KR)    ............... 2000-22479

(51) Int. Cl.
*H04N 5/445*    (2006.01)

(52) U.S. Cl. ................................. 348/569
(58) Field of Classification Search ........... 348/569, 348/563, 565, 564, 567, 553; 345/721, 719; 725/109, 110
See application file for complete search history.

(56) References Cited

U.S. PATENT DOCUMENTS

| | | | | |
|---|---|---|---|---|
| 5,946,051 A | * | 8/1999 | Bril | 348/553 |
| 5,991,832 A | * | 11/1999 | Sato et al. | 710/33 |
| 6,008,836 A | * | 12/1999 | Bruck et al. | 725/131 |
| 6,025,837 A | * | 2/2000 | Matthews, III et al. | 345/721 |
| 6,057,888 A | * | 5/2000 | Bril | 348/553 |
| 6,064,385 A | * | 5/2000 | Sturgeon et al. | 345/841 |
| 6,215,467 B1 | * | 4/2001 | Suga et al. | 345/660 |
| 6,460,181 B1 | * | 10/2002 | Donnelly | 725/50 |
| 6,519,009 B1 | * | 2/2003 | Hanaya et al. | 348/564 |
| 6,573,907 B1 | * | 6/2003 | Madrane | 345/719 |
| 6,591,292 B1 | * | 7/2003 | Morrison | 709/206 |
| 6,661,437 B1 | * | 12/2003 | Miller et al. | 345/810 |

* cited by examiner

*Primary Examiner*—Paulos M. Natnael
(74) *Attorney, Agent, or Firm*—Fleshner & Kim, LLP

(57) ABSTRACT

The present invention relates to a TV which is capable of displaying an OSD (On Screen Display) with a user request language and format, in particular to a TV having an OSD function and a control method of the same which is capable of generating a pertinent OSD by being provided a user OSD set menu and an OSD generation program corresponding to the original information of a TV, satisfying a desire of a user by displaying the generated OSD on a screen, and improving the convenience.

14 Claims, 4 Drawing Sheets

TV HAVING OSD FUNCTION AND CONTROL METHOD OF THE SAME

BACKGROUND OF THE INVENTION

1. Field of the Invention

The present invention relates to a TV (television), in particular to a TV (Television) having an OSD (On Screen Display) function and a control method of the same which is capable of selecting a user request OSD (On Screen Display) function.

2. Description of the Prior Art

Recently, various types of televisions from a small model such as a 14 inch television to a projection television not less than 60 inch are introduced to a consumer.

In the meantime, the analog TV has lots of problems while developing to a scale-up, a high-function. In other words, there is the problem such as a picture quality lowering, a limitation of broadcast channels, a limitation of one-way medium, and market saturation of an analog TV etc. Accordingly, a digital television is introduced in order to make up for the weak points in the analog television.

Presently, developing of a technology about the digital TV is progressing actively, it has entered a new phase performing a test broadcast or a regular broadcast about the digital TV.

The digital TV provides a menu screen having an OSD (On Screen Display) format superior to an OSD of the analog TV as well as a basic video and audio.

Hereinafter, a construction of the digital TV in accordance with the prior art will now be described with reference to accompanying FIG. 1.

FIG. 1 is a block diagram illustrating the construction of the digital TV in accordance with the prior art.

As depicted in FIG. 1, the digital TV comprises a tuner 1 for tuning in to a broadcast signal of a user select channel among broadcast signals of each channel received through an antenna, a VSB (Vestigial Side Band) demodulator 2 for correcting an error by demodulating the user select broadcast signal and outputting the signal after converting it into a transport stream format, a demultiplexer 3 for demultiplexing the transport stream (dividing into video, audio and additional information signal sequence), a MPEG (Moving Picture Expert Group) audio/video decoder 4 for outputting video and audio signals by extending/restoring the demultiplexed transport stream (video and audio signal sequence), an audio processing unit 5 for converting the audio signal into an analog audio signal in order to output the audio signal through a speaker, a video processing unit 6 for converting the video signal into luminance and color signals in order to display the video signal on a screen, a memory unit 7 for storing the additional information outputted from the demultiplexer 3, a control unit 8 for controlling each part of the system and performing database operation about the stored additional information in order to make the information display with a graphic user interface, and a network interface unit 9 for performing a two-way communication such as the internet.

The operation of the digital TV will now be described.

First, the broadcast signal of the user select channel is received through the tuner 1, and is converted into the transport stream format through the VSB demodulator 2.

The transport stream modulated in the VSB demodulator 2 is divided into a compressed and encoded broadcast video, audio signals, and additional information in accordance with a MPEG (Moving Picture Expert Group) standard through the demultiplexer 3. Herein, the transport stream is a digital signal as the video, audio, data and broadcast information is multiplexed temporally by packet units.

After that, the MPEG (Moving Picture Expert Group) audio/video decoder 4 outputs the video and audio signals by extending/restoring the divided video signal and additional information.

The video processing unit 6 displays the video signal on the screen after processing the video signal with a NTSC (National Television System Committee) format or a PAL (Phase Alternation Line) format. In addition, the audio processing unit 5 outputs the audio signal through the speaker after processing the audio signal by synchronizing with the video signal.

In the meantime, when a menu select or an operation order related to video/audio is inputted from a user, an OSD (On Screen Display) for embodying an operation progress circumstances or a menu screen is formed by the control unit 8, the formed OSD (On Screen Display) is displayed on the screen through the video processing unit 6. Herein, the OSD (On Screen Display) is limited as one language and one format in manufacture of a product (TV).

As described above, in the digital TV in accordance with the prior art, because the OSD for displaying the menu or user order progress state is outputted with only one language and one format, selecting a language or a format in accordance with the user taste is impossible, accordingly it is impossible to satisfy a desire of the user.

SUMMARY OF THE INVENTION

The object of the present invention is to provide a TV (television) having an OSD (On Screen Display) function and a control method of the same which is capable of displaying an OSD (On Screen Display) with a user request language and format.

In order to achieve the object of the present invention, the TV having the OSD (On Screen Display) function in accordance with the present invention comprises a service site server for providing a user OSD (On Screen Display) set menu and an OSD generation program corresponding to the original information of the TV, a control unit generating a pertinent OSD by using the OSD generation program, and a video processing unit for displaying the generated OSD on a screen.

In addition, in order to achieve the object of the present invention, in a TV supplied a service through a network interface, the control method of the TV having the OSD (On Screen Display) function comprises transmitting a user OSD set menu corresponding to the original information of the TV by contacting to a service site server when an OSD set key signal is inputted, transmitting the OSD generation program corresponding to the user request OSD menu in the user OSD set menu, and generating an OSD corresponding to an operation order signal by using the OSD generation program when an operation order signal of the user is inputted.

DETAILED DESCRIPTION OF THE PREFERRED EMBODIMENT

Hereinafter, an embodiment of a TV (Television) having an OSD (On Screen Display) function and a control method of the same in accordance with the present invention will now be described in detail with reference to accompanying FIGS. 2~4.

Figure 2:
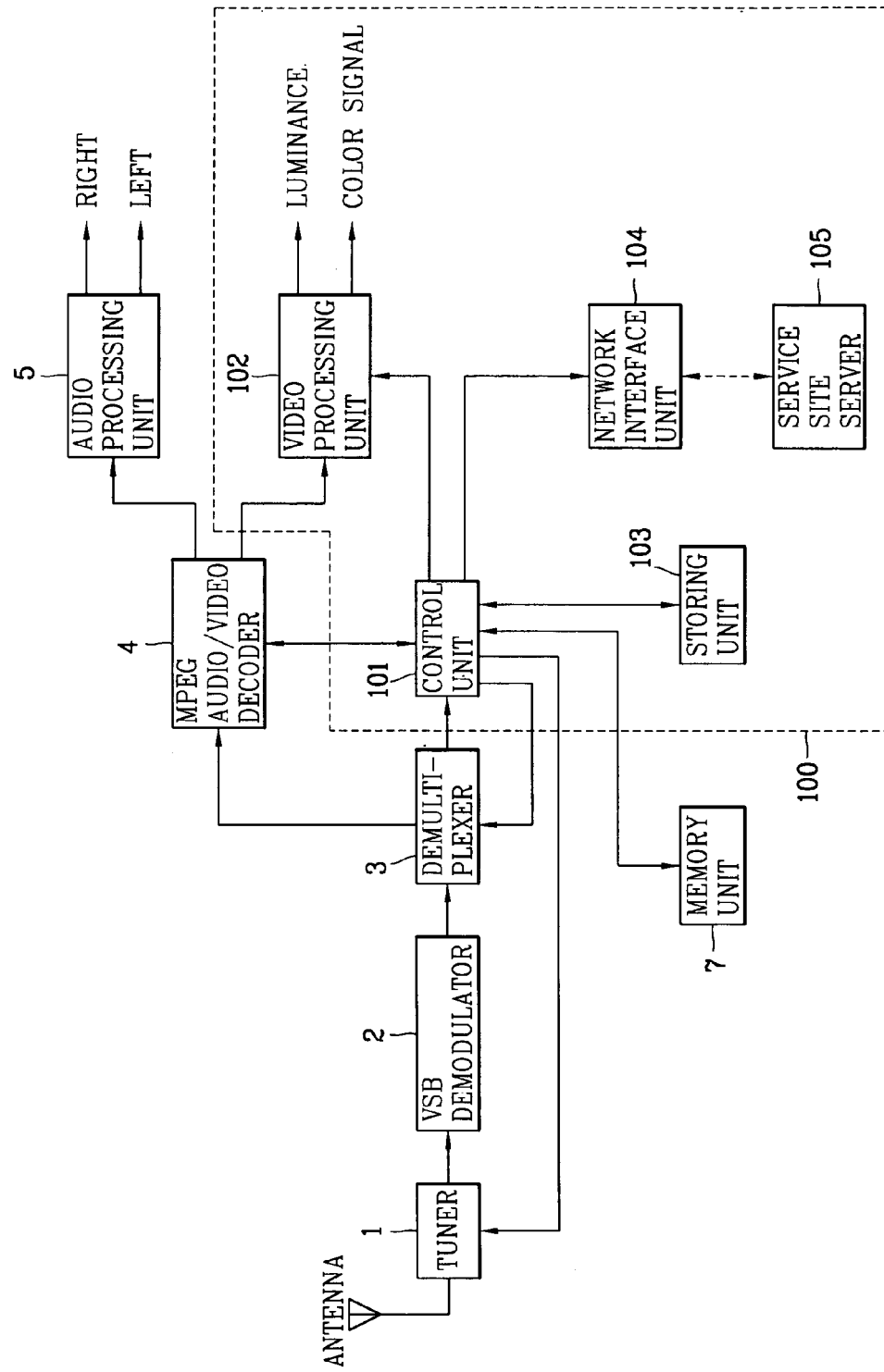
FIG. 2 is a block diagram illustrating a construction of a digital TV having an OSD (On Screen Display) function in accordance with the present invention.

FIG. 2 is a block diagram illustrating a construction of a digital TV (Television) having an OSD (On Screen Display) function in accordance with the present invention.

As depicted in FIG. 2, the digital TV having the OSD (On Screen Display) function in accordance with the present invention comprises a tuner 1 for tuning in to a broadcast signal of a channel selected by a user among broadcast signals of each channel received through an antenna, a VSB (Vestigial Side Band) demodulator 2 for correcting an error by demodulating the user select broadcast signal and outputting the signal after converting it into a transport stream format, a demultiplexer 3 for demultiplexing the transport stream (dividing into video, audio and additional information signal sequences), a MPEG (Moving Picture Expert Group) audio/video decoder 4 for outputting video and audio signals by extending/restoring the demultiplexed transport stream (video and audio signal sequences), an audio processing unit 5 for converting the audio signal into an analog audio signal in order to output the audio signal through a speaker, a video processing unit 102 for converting the video signal into luminance and color signals in order to display the video signal on a screen, a memory unit 7 for storing the additional information outputted from the demultiplexer 3, a service site server 105 for providing a user OSD (On Screen Display) set menu and an OSD (On Screen Display) generation program corresponding to the original information of the TV, a network interface unit 104 for contacting to the service site server 105, a storing unit 103 for storing the original information and contact information of the service site server, and a control unit 101 for transmitting the original information by contacting to the service site server 105 by using the contact information stored in the storing unit 103, storing the OSD generation program corresponding to the OSD setting menu selected by the user in the storing unit 103, generating a pertinent OSD by using the OSD generation program stored in the storing unit 103 when an operation order of the user is inputted, and transmitting it to the video processing unit 102.

Herein, the service site server 105 stores an OSD (On Screen Display) generation program for embodying formats of various OSD (On Screen Display) by product (TV) models, and an OSD (On Screen Display) generation program for embodying various languages of an OSD (On Screen Display). In addition, the service site server 105 stores user OSD (On Screen Display) set menu screen information (hereinafter, it is referred to a "user OSD set menu") for making the user set the various OSD (On Screen Display) formats and OSD (On Screen Display) languages on the TV screen. In addition, a function of the service site server 105 can be included in the TV. Herein, the OSD (On Screen Display) generation program for embodying the various OSD (On Screen Display) formats embodies various OSD (On Screen Display) having different volumes or different formats.

Figure 1:
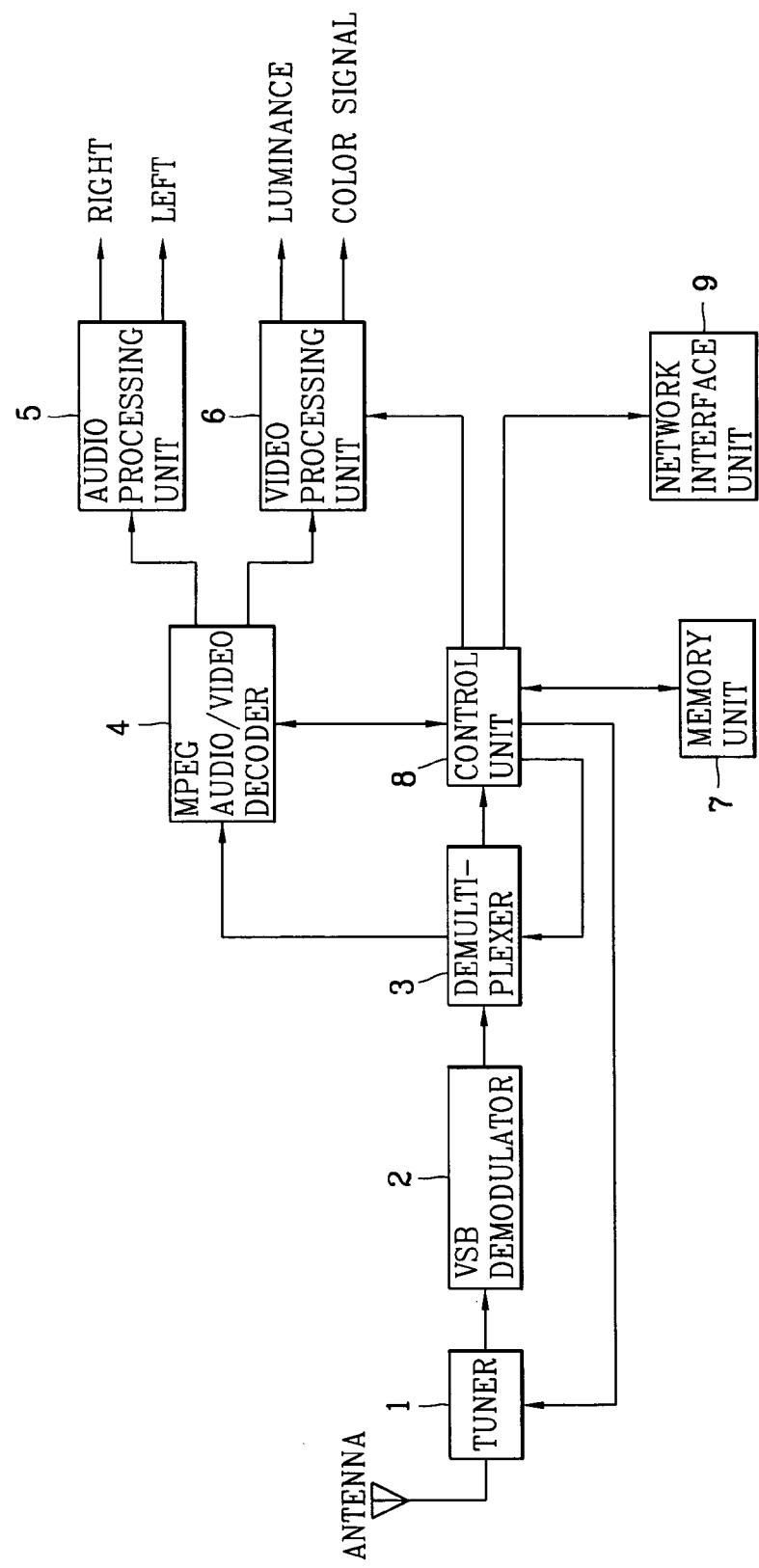
FIG. 1 is a block diagram illustrating a construction of a digital TV in accordance with the prior art.

Hereinafter, parts (1~5, 7) performing same operation with FIG. 1 will be described with the same reference numerals, and overlapped explanation is abridged.

Accordingly, the OSD (On Screen Display) processing unit 100 and service site server 105 of the digital TV having the OSD (On Screen Display) function in accordance with the present invention will now be described in detail with reference to accompanying FIG. 3.

Figure 3:
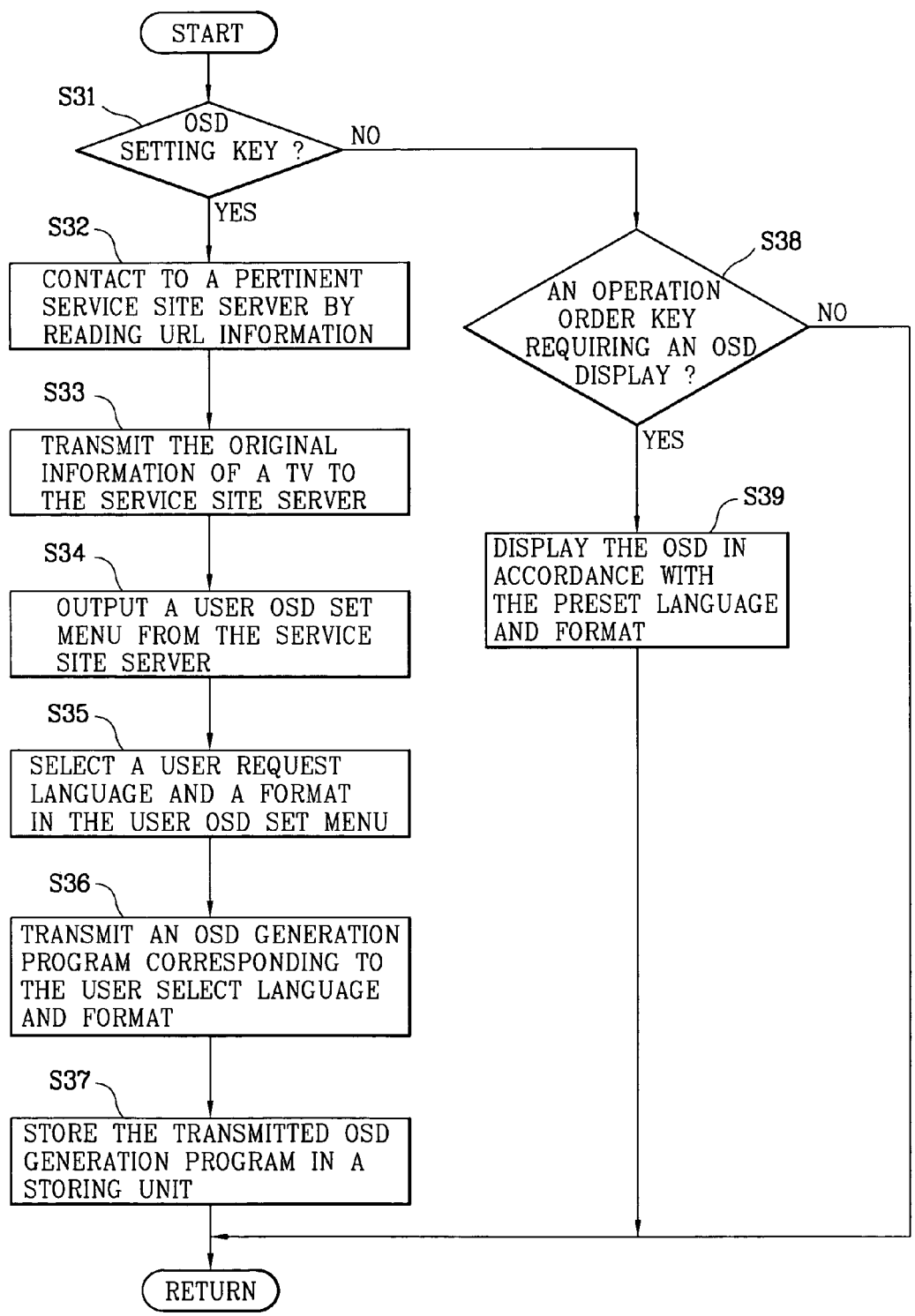
FIG. 3 is a flow chart illustrating a control method of a digital TV having the OSD (On Screen Display) function of FIG. 2.

FIG. 3 is a flow chart illustrating a control method of a digital TV having the OSD function of FIG. 2. The operation of the OSD (On Screen Display) processing unit 100 will now be described in detail. Herein, the OSD processing unit 100 comprises the control unit 101, network interface unit 104, storing unit 103, and video processing unit 102.

First, the control unit 101 judges whether an OSD (On Screen Display) set key signal is inputted from the user S31.

When the OSD set key signal is inputted, the storing unit 103 contacts to the service site server 105 through the network interface 104 by reading the contact information S32. Herein, the contact information is a URL (Uniform Resource Locator) etc.

After that, the control unit 101 transmits the original information stored in the storing unit 103 to the service site server 105 S33. In other words, the original information stored in the storing unit 103 is uploaded to the service site server 105. Herein, the original information is a model name or a model number of the TV etc.

When the original information is transmitted to the service site server 105, the service site server 105 transmits the user OSD (On Screen Display) set menu corresponding to the original information to the control unit 101 S34.

The control unit 101 displays the user OSD (On Screen Display) set menu transmitted from the service site server 105 on the screen through the video processing unit 102.

After that, the user request OSD (On Screen Display) language and format are selected in the user OSD (On Screen Display) set menu displayed on the screen S35. Herein, the user OSD (On Screen Display) set menu is consistant with OSD (On Screen Display) language information and OSD (On Screen Display) format information. For example, the user selects the request language among the OSD (On Screen Display) languages such as Korean, English, Japanese or French etc. of the OSD (On Screen Display) language information of the user OSD (On Screen Display) set menu. In addition, the user request OSD (On Screen Display) format, namely, OSD (On Screen Display) type or OSD (On Screen Display) volume is selected in the OSD (On Screen Display) format information of the user OSD (On Screen Display) set menu.

And, the service site server 105 transmits the OSD (On Screen Display) generation program for embodying the OSD (On Screen Display) in accordance with the user select OSD (On Screen Display) language and format to the control unit 101 S36.

The control unit 101 updates the former OSD (On Screen Display) format and language information by storing the OSD (On Screen Display) generation program transmitted from the service site server 105 in the storing unit 103 S37. In other words, the control unit 101 of the TV updates the former stored OSD (On Screen Display) language and format information as OSD (On Screen Display) language and format information in the OSD (On Screen Display) generation program by storing the OSD (On Screen Display) generation program transmitted from the service site server 105 in the storing unit 103.

In the meantime, in judging process for judging whether the OSD (On Screen Display) set key signal by the user is inputted or not S31, when the OSD (On Screen Display) set key signal is not inputted, it is judged whether an operation order key signal for requesting the OSD (On Screen Display) is inputted or not S38.

When the operation order key signal is inputted, the OSD (On Screen Display) corresponding to the updated OSD (On Screen Display) language and format is generated by using the OSD (On Screen Display) generation program stored in the memory unit 103, and in order to display it on the screen it is transmitted to the video processing unit 102 S39.

Hereinafter, the operation of the service site server 105 will now be described in detail with reference to accompanying FIG. 4.

Figure 4:
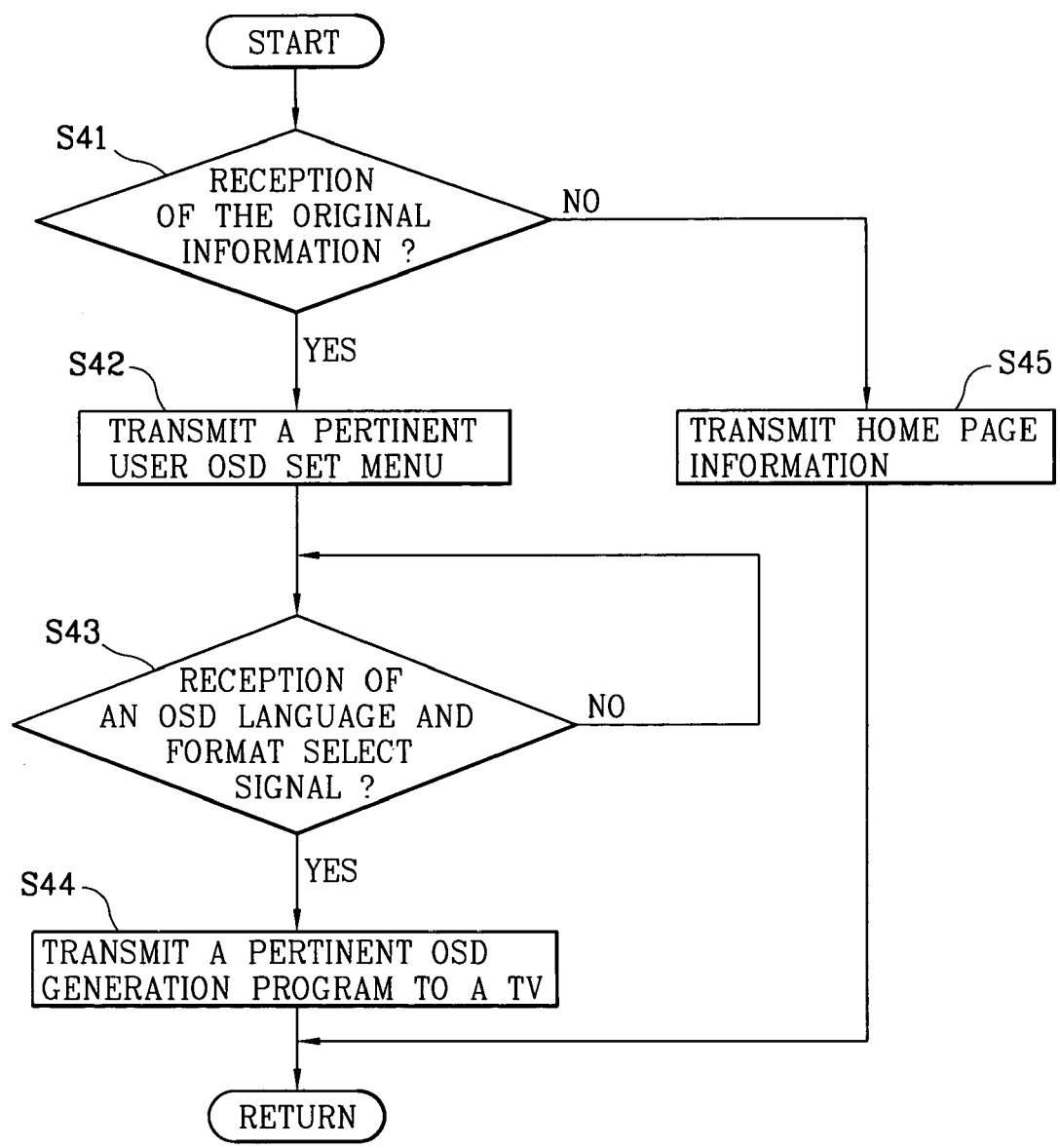
FIG. 4 is a flow chart illustrating an operation of a service site server in the control method of the digital TV having the OSD (On Screen Display) function of FIG. 3.

FIG. 4 is a flow chart illustrating an operation of a service site server in the control method of the digital TV having the OSD function of FIG. 3, it will now be described in detail.

First, the service site server 105 judges whether the original information (model name or model number of the TV) of the TV is received S41.

When the original information is received, the user OSD set menu corresponding to the original information (model name or model number) in the user OSD set menu classified by TV models is transmitted to the control unit 101 of the TV (television) S42.

After that, it is judged whether a signal selecting the OSD (On Screen Display) language and format is received or not S43. In other words, it is judged whether a signal for selecting the user request OSD language and format is transmitted.

When the signal for selecting the OSD (On Screen Display) language and format is received, the OSD (On Screen Display) generation program corresponding to the OSD (On Screen Display) language and format is transmitted to the control unit 101 of the TV through the network interface unit 104 S44.

After that, the OSD (On Screen Display) generation program is stored in the storing unit 103 of the TV by the control unit 101, when the user requests the OSD (On Screen Display), the OSD (On Screen Display) language and format information in the OSD (On Screen Display) generation program is displayed on the screen through a certain signal processing process.

Meanwhile, when the original information is not received, the service site server 105 transmits home page information related to the product (TV) to the control unit 101 of the TV through the network interface unit 104 S45.

After that, the home page information is displayed on the screen through the certain signal processing process.

As described, the present invention is capable of satisfying the desire of the user, and improving the convenience of the user by selecting a user request OSD (On Screen Display) language and format in various OSD (On Screen Display) languages and formats.

What is claimed is:

1. A system for controlling a TV having an OSD (On Screen Display) function, comprising:
    a service site server configured to provide a user OSD set menu and a first OSD generation program which corresponds to original information of the TV, wherein the first OSD generation program is configured to provide a plurality of language selections and a plurality of viewing and display processing format selections;
    a control unit configured to receive the user OSD set menu and the first OSD generation program from the service site server and to generate a corresponding OSD;
    a storing unit configured to store the original information, contact information related to the service site server, and the first OSD generation program which corresponds to the original information, wherein the control unit is configured to contact the service site server using the contact information stored in the storing unit, and to store a second OSD generation program which corresponds to an OSD set menu selected by a user from a plurality of user OSD set menus stored in the storing unit; and
    a video processing unit configured to display the OSD generated by the control unit on a screen.

2. The system according to claim 1, wherein the service site server is configured to make contact with the control unit through a network interface unit.

3. The system according to claim 1, wherein the plurality of viewing format selections comprise a plurality of aspect ratios, and wherein the plurality of display processing formats comprises at least NTSC and PAL.

4. The system according to claim 1, wherein the user OSD set menu is configured to allow a user to select a user request language from the plurality of language selections provided by the first OSD generation program, and to select a user request format from the plurality of viewing and display processing format selections provided by the first OSD generation program.

5. The system according to claim 4, wherein the format comprises at least one of a display processing type format and an aspect ratio format.

6. The system according to claim 1, wherein the original information comprises at least a model name or a model number of the TV.

7. The system according to claim 1, wherein the contact information comprises a URL (Uniform Resource Locator).

8. The system according to claim 1, wherein the control unit is configured to receive an operation order signal input by a user, to access the second OSD generation program stored in the storing unit, and to generate an OSD based on the operation order signal.

9. A control method of a TV having an OSD (On Screen Display) function, comprising: receiving a user OSD set menu which corresponds to original information of the TV by contacting a service site server when an OSD set key signal is generated, comprising uploading the original information of the TV by contacting the service site server, and receiving a user OSD set menu which corresponds to the uploaded original information;
    receiving an OSD generation program which corresponds to the user request OSD set menu; and
    generating a user OSD which reflects a user selected language and user selected viewing and display processing formats corresponding to an operation order signal by accessing the OSD generation program when the operation order signal is input by a user.

10. The control method according to claim 9, wherein generating the user OSD comprises updating a former OSD generation program with the received OSD generation program, and generating an OSD which corresponds to the operation order signal by using the updated OSD generation program.

11. The control method according to claim 9, wherein the original information comprises at least a model name or a model number of the TV.

12. The control method according to claim 9, wherein the OSD generation program comprises a plurality of language selections and a plurality of viewing and display processing format selections.

13. The control method according to claim 12, further comprising selecting a user request language from the plurality of language selections provided by the OSD generation program, and selecting a user request format from the plurality of viewing and display processing format selections provided by the OSD generation program.

14. The control method according to claim 13, wherein the plurality of viewing format selections comprises a plurality of aspect ratios, and wherein the plurality of display processing format selections comprises at least NTSC and PAL.

* * * * *